United States Patent

Schuman

[15] 3,693,688
[45] Sept. 26, 1972

[54] TIRE STUDS

[72] Inventor: Mark Schuman, 101 G St., S.W. Apt. 516, Washington, D.C. 20024

[22] Filed: Jan. 8, 1971

[21] Appl. No.: 104,914

[52] U.S. Cl..................................................152/210
[51] Int. Cl.................................................B60c 11/16
[58] Field of Search......................................152/210

[56] References Cited

FOREIGN PATENTS OR APPLICATIONS 1,505,104   3/1969   Germany...................152/210

Primary Examiner—James B. Marbert

[57] ABSTRACT

A studded tire having blind holes in its tread into which headed studs are fitted, with a space provided between the inner end of each stud head and the bottom of its blind hole, and passageways communicating said space to the exterior of the tread for passage of fluid from the road to the space for forming a less compressible backing for the studs when they contact a wet road surface.

11 Claims, 11 Drawing Figures

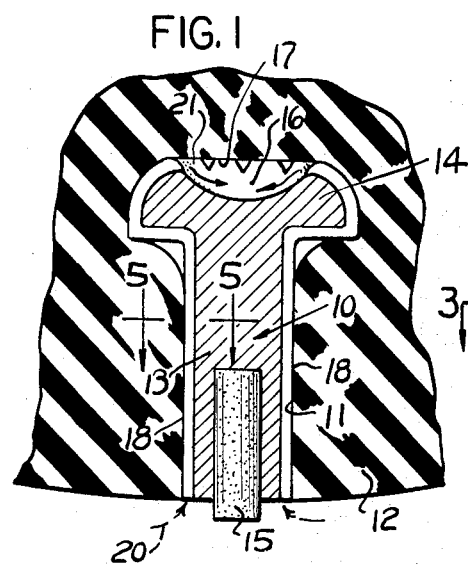
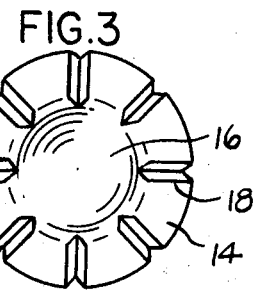
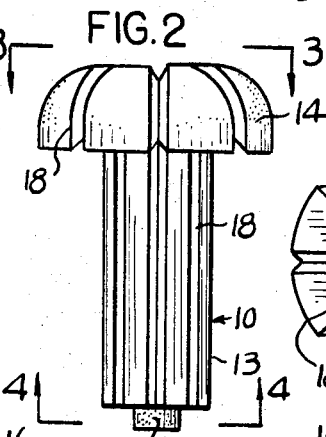
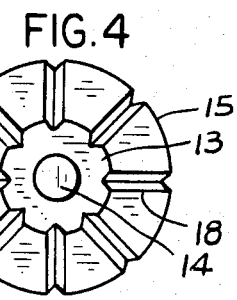
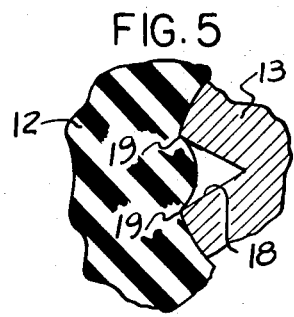
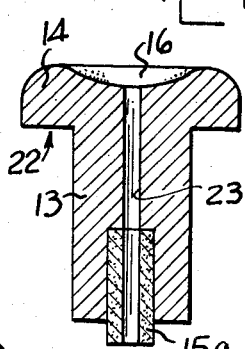
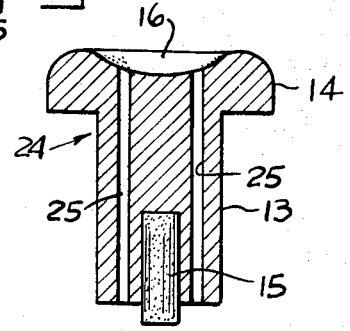
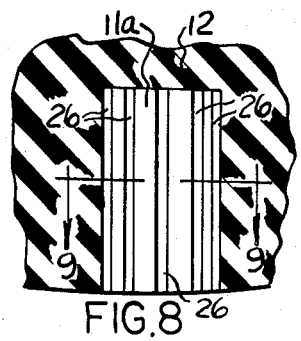
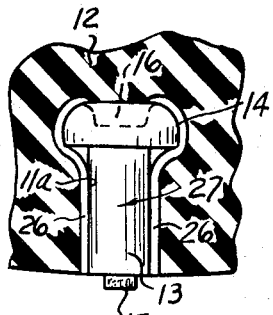
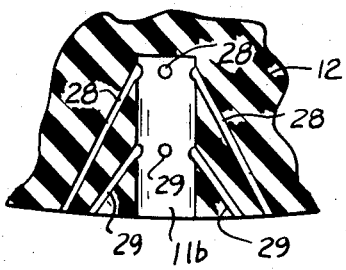
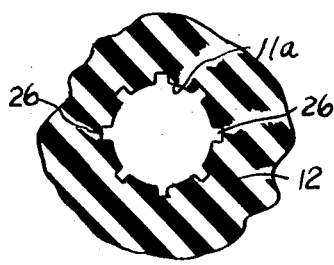
INVENTOR
MARK SCHUMAN

TIRE STUDS

BACKGROUND OF INVENTION

Conventional studded tires generally consist of pneumatic, rubber tires having numerous blind holes formed in their treads into which hard carbide tipped studs are inserted and frictionally held. While the details of construction of known studs vary considerably, they generally consist of an elongated shank with an integral head, which is positioned at the bottom or blind end of the tire hole, and with a tungsten or other hard carbide insert or plug fitted into the free end of the shank and extending outwardly therefrom slightly for contact with the road surface.

In the past, various types of surface configurations have been formed upon studs to cause them to more tightly lock or to be gripped within the rubber portion defining the tire hole. A purpose of these configurations has been to improve the fastening between the studs and the tire to prevent the studs from twisting or disengaging and flying out of the tire. Another purpose was to permit a more resilient movement of the stud when it contacts the road, since lack of resilience causes a relative movement between the stud and tread which tends to generate heat. This tends to degenerate the tire rubber and stud, since the heat is localized and poorly dissipated due to the sealing between the stud and tire and the poor conductivity of the tire rubber. Lack of resilience also increases stud wear on hard pavement, by pressing the stud harder against the pavement.

By way of example, samples of the above described types of tire studs are illustrated in the prior U.S. patent to Smith, U.S. Pat. No. 3,404,718 issued Oct. 8, 1968 and to Carlstedt, U.S. Pat. No. 3,477,490, issued Nov. 11, 1969.

The invention herein relates to an improvement in the mounting of and form of tire studs wherein fluid may circulate around the stud and in the tire hole both for cooling and also for providing a liquid, rigidifying backing for the studs when contacted against a wet or icy or snowy road surface.

SUMMARY OF INVENTION

This invention generally contemplates providing fluid passageways either through or around a tire stud to partially communicate the outer tread surface with a space formed between the head of the stud and the bottom of the blind hole in the tire tread within which it was mounted for restricted circulation of fluid, such as air or water, into and out of said space for cooling purposes and, in the case of non-compressible fluids, such as water, for additionally providing a rigidifying backing for the stud to better thrust against wet road surfaces or icy surfaces partially liquified by the pressure and heat of the tire and studs.

The tire stud herein is conventional in that it may include the conventional shank and integral head with the carbide insert in the shank for contacting the road surface. The novelty relates to providing fluid passageways by forming continuous grooves on the outside surfaces of the stud or internal openings through the length of the stud for providing a restricted flow path between the road surface and a depression or concavity formed in the inner end of the stud head, which provides a space between the stud and the bottom of the blind hole in the tire. On dry pavement, some air may circulate through the grooves or passageways for cooling the stud and adjacent tire rubber. On wet or near freezing icy pavement, water entering into the space, because of its incompressibility and viscosity, will momentarily form a relatively rigid backing for the stud, along its longitudinal axis, so that it more rigidly thrusts into or against the road rather than resiliently backs away from it. Thus, desirable traction, as well as undesirable stud wear and noise, increase by this feature during slippery road conditions, but decrease under more normal road conditions.

As a modification, the fluid passageways may be formed in the tire itself, using a conventional stud, as for example by forming grooves along the lengths of the blind holes in the tire or by drilling angularly directed holes through the tire tread to communicate the exterior of the tread to the interior of the blind holes.

These and other objects and advantages of this invention may become apparent upon reading the following description, of which the attached drawings form a part.

DESCRIPTION OF DRAWINGS

FIG. 1 is a fragmentary, cross-sectional view of a portion of a studded tire with a stud mounted therein.

FIG. 2 is an elevational view of the stud per se.

FIG. 3 is a top, plan view, taken in the direction of arrows 3—3 of FIG. 2.

FIG. 4 is a bottom view of the stud taken in the direction of arrows 4—4 of FIG. 2.

FIG. 5 is an enlarged, fragmentary view of a portion of the stud and tire, taken in the direction of arrows 5—5 of FIG. 1.

FIG. 6 is a modification of the stud, shown with a central opening or passageway.

FIG. 7 illustrates another modified stud having openings extending therethrough.

FIG. 8 illustrates a modified form of stud receiving hole in the tire.

FIG. 9 is a cross-sectional view taken in the direction of arrows 9—9 of FIG. 8.

FIG. 10 illustrates a stud mounted within the hole illustrated in FIGS. 8 and 9.

FIG. 11 illustrates another modification of the hole formed in the tire.

DETAILED DESCRIPTION

FIG. 1 illustrates a tire stud 10 mounted within a radially directed, blind hole 11, drilled or molded in the tread of a conventional rubber, pneumatic tire 12. The stud consists of an elongated shank 13 having an integral, enlarged head 14 formed on one end and a conventional hard carbide insert 15 fitted into and extending a short distance outwardly of its opposite end.

The conventional blind holes formed in the tires are cylindrical in shape and the studs are forced into these holes so that the rubber flows around and conforms to the shape of the stud, gripping the head and shank to hold the stud against falling out.

As illustrated in FIGS. 1–3, the inner or free end of the head 14 is depressed or dished to provide a central cavity portion 16. This forms a space or chamber 17 between the central portion of the head and the bottom end of the blind hole 11.

A number of continuous grooves 18 are formed in the outer surface of the stud. These grooves extend the full length of the shank (see FIG. 2) along the undersurface of the head (see FIG. 4), around the outer edges of the head (see FIGS. 1 and 2), and over the top of the head, opening into the concave central portion 16 (see FIGS. 1 and 3).

The grooves 18 are relatively narrow and deep so that their outer side edges 19 (see FIG. 5) bite into or frictionally grip against the rubber wall defining the hole in the tire. The rubber portions overlying the grooves tend to flow into the grooves, but due to the narrowness and depth thereof, most or all of the time, only partially enter the grooves leaving a substantial portion thereof clear, as illustrated in FIG. 5.

In operation, when the studded tire is driven on a dry pavement, contact of each stud with the pavement forces air back and forth through the grooves 18 and the space 17 between the head and the bottom of the individual stud filled holes to provide a cooling effect. The flow of air also tends to constantly clean out or scrub away any accumulations of dust, dirt or the like.

When the tire is driven upon the wet pavement such as one covered with ice or snow or rainwater, the water or other liquid flows through the passageways formed by the grooves 18 and into the space 17 above of each of the studs to cool the studs and surrounding rubber areas as well as clean the passageways. However, when each stud strikes against the pavement, the liquid trapped in the space 17 between the stud head and the bottom of the tire hole, momentarily acts as a relatively non-compressible backing against the axial thrust or force upon the stud to reduce the tendency of the stud to resiliently move away from the pavement and into the tire, thereby better pushing against or biting into the wet road surface.

The degree of liquid trapping may be controlled by varying the size, shape, length and number of passageways. For example, the cross-sectional shape of the passageways may be formed to permit the tire rubber to momentarily close or substantially close the passageway as the rubber is compressed by road contact.

MODIFICATION—FIG. 6

FIG. 6 illustrates a modified stud 22 having a central opening 23 extending axially through its shank 13, carbide insert 15a and head 14 to communicate the free end of the insert with the concavity 16 in the head. Thus, fluid moves into and out of the concave central portion of the head through the axial passageway 23.

MODIFICATION—FIG. 7

FIG. 7 illustrates another form of stud 24 having a number of axially parallel openings 25 formed through the shank 13 and head 14 to communicate into the concave central portion 16 of the head. It is otherwise similar in operation and construction to that described above.

TIRE HOLE MODIFICATION—FIGS. 8–10

FIGS. 8–10 illustrate a modified tire hole 11a, wherein the fluid passageways are provided by means of grooves 26 formed in the wall defining the tire stud hole so that when a stud 27 is mounted within the hole, the grooves 26 provide the fluid passageways around the outside of the stud and into the concave central portion 16 of the stud head 14.

Here, the desired effect is produced by modifying the holes formed in the tire rather than the studs. The number and shape of the grooves 26 may be varied as desired.

MODIFIED TIRE HOLE—FIG. 11

FIG. 11 illustrates a further modification of the hole formed in the tire to receive the studs. Here, the hole 11b is cylindrical as in the conventional tire stud blind mounting holes. However, angularly directed passageways 28 are drilled through the tread to communicate the outside surface of the tread to points near the bottom or inner end of the hole 11b. Additionally, where further cooling or resilient effect may be desired, holes 29 may be drilled at an angle through the tread from the surface thereof to the central portion of the hole 11b.

A stud such as illustrated in FIG. 10 would be inserted into the hole 11b, with the operation and results being similar to that described above.

Having fully described an operative embodiment of this invention, I now claim:

1. In a studded tire comprising a conventional rubber tire having a number of radially directed, outwardly opening, blind holes formed in its outer circumferential tread portion, and a stud having a head portion and a shank portion inserted within each of said holes with the head portion at the blind end of the hole and the free end of each shank portion extending outwardly of the hole, the improvement comprising:

a space formed by having the free end of the head portion centrally depressed relative to the peripheral edge of the head portion free end, and a passageway extending the full length of the stud from the free end of the shank to the blind end of the hole communicating said space to the outer circumferential surface of said tread portion for passing fluid from the exterior of the tire into said space; so that when the tire is driven upon a wet road, liquid from the road enters said space and momentarily forms a substantially non-compressible backing for each stud as it contacts the road to more rigidly hold said studs against the road surface.

2. A construction as defined in claim 1, and said passageway comprising grooves formed on the outer surface of each of said studs, with the grooves each continuously extending longitudinally of the shank portion from its free end to the head portion and then continuing around the head portion to the central depression.

3. A construction as defined in claim 2, and said grooves having relatively sharp edges at the exterior surface of the stud for biting into the rubber of the tire;

the grooves being sufficiently narrow in cross-section and of sufficient depth to restrict the rubber of the tire from completely entering into and filling the grooves, wherein the grooves form open passageways between the studs and the tire portions surrounding the studs.

4. A construction as defined in claim 1, and said passageway including at least one opening extending through the stud, in an axial direction, from the free end of its shank to the depressed central portion of the free end of its head portion.

5. A construction as defined in claim 1, and each passageway comprising relatively small openings formed in the tire tread at the corresponding hole and extending from the surface of the tread into the blind end of said hole.

6. A construction as defined in claim 5, and said openings being in the form of axially directed, narrow grooves formed in the wall defining each of said holes and extending the length of said holes and opening into the interior of the holes as well as at the tire tread outer surface.

7. A construction as defined in claim 5, and said openings at each of said holes extending at a sharp, acute angle relative to the axis of the hole, from the blind end of the hole to the outer surface of the tread.

8. In a tire stud formed of an elongated shank having an outer, free end and an inner end joined with an enlarged head portion for fitting within a radially directed, blind hole formed in a conventional rubber tire tread, with the free end of the shank at the surface of the tread for contacting a road surface, and with the end of the head portion arranged adjacent to and forming an inner surface opposing the blind end of the hole, the improvement comprising:

grooves formed in the exterior surface of the stud and extending the full length of the shank and continuing around the head portion towards the central portion of said inner surface of said head portion;

and said central portion being depressed relative to peripheral edge portions of said head portion to form a space between the head portion and the bottom of the blind hole;

said grooves being continuous to form fluid passageways, so that liquid from the road surface passes through said grooves and into said space to momentarily form a non-compressible, rigidifying backing for each stud as it contacts the road surface.

9. A construction as defined in claim 8, and said grooves having relatively sharp edges at the exterior surface of the stud for biting into the rubber of the tire surrounding and in contact with the stud;

the grooves being sufficiently narrow in cross-section and of sufficient depth to restrict the rubber of the tire from completely entering into and filling the grooves, wherein the grooves form open passageways between the stud and the tire portions surrounding the stud.

10. In a tire stud formed of an elongated shank having an outer, free end and an inner end joined with an enlarged head portion for fitting within a radially directed, blind hole formed in a conventional rubber tire tread, with the free end of the shank at the surface of the tread for contacting a road surface and with the end of the head portion arranged adjacent to and forming an inner surface opposing the blind end of the hole, the improvement comprising:

at least one open passageway extending the full length of the stud from the free end of the shank to the blind end of the hole;

said inner surface having a depressed portion forming a space between the head portion and the bottom of said blind hole;

so that liquid picked up from the road passes through said passageway into the space formed by the depressed portion of the head portion to provide momentarily a non-compressible, rigidifying backing for the stud when its free end contacts a road surface.

11. A construction as defined in claim 10 wherein said open passageway includes a formed passage in the head portion extending from the surface of the head portion adjacent the shank protion to said space.

* * * * *